United States Patent [19]
Goellner

[11] Patent Number: 5,795,119
[45] Date of Patent: *Aug. 18, 1998

[54] ADJUSTABLE LOCK NUT

[75] Inventor: Willy J. Goellner, Rockford, Ill.

[73] Assignee: Advanced Machine & Engineering Co., Rockford, Ill.

[*] Notice: The term of this patent shall not extend beyond the expiration date of Pat. No. 5,634,753.

[21] Appl. No.: 797,111

[22] Filed: Feb. 10, 1997

Related U.S. Application Data

[63] Continuation-in-part of Ser. No. 608,724, Feb. 29, 1996, Pat. No. 5,634,753.

[51] Int. Cl.$^6$ ............................................. F16B 39/22
[52] U.S. Cl. ........................ 411/288; 411/433; 411/290; 411/291
[58] Field of Search ..................... 411/319, 315, 411/333, 335, 349, 193, 393, 432, 433, 937, 937.2, 938, 940, 965, 967, 285–291

[56] References Cited

U.S. PATENT DOCUMENTS

| | | |
|---|---|---|
| 171,898 | 1/1876 | Wiles ........................ 411/291 |
| 609,144 | 8/1898 | Goddin . |
| 735,992 | 8/1903 | Martin . |
| 1,111,732 | 9/1914 | Breault . |
| 1,202,678 | 10/1916 | Curry . |
| 1,406,065 | 2/1922 | Norwood . |
| 3,179,141 | 4/1965 | Folmar ........................ 411/940 |
| 3,316,795 | 5/1967 | Tann . |
| 3,385,339 | 5/1968 | Dahl . |
| 3,667,525 | 6/1972 | Speith . |
| 4,043,692 | 8/1977 | Hund . |
| 4,068,946 | 1/1978 | Keen . |
| 4,095,914 | 6/1978 | Thomsen . |
| 4,557,652 | 12/1985 | Lundgren . |
| 5,454,674 | 10/1995 | Eriksson . |

FOREIGN PATENT DOCUMENTS 1114185  11/1941  Australia .

*Primary Examiner*—Steven N. Meyers
*Assistant Examiner*—Gary Estremsky
*Attorney, Agent, or Firm*—Vernon J. Pillote

[57] ABSTRACT

An adjustable lock nut comprising a one-piece annular body having an internally threaded axial bore extending between and faces of the body and a circumferential outer face. The body has a narrow annular internal groove that opens intermediate the ends of the axial bore and extends generally radially outwardly from the axial bore. A set of radial bores extend into the body at circumferentially spaced locations with their axes disposed in a plane normal to the body axis and bisecting the internal groove and the radial bores each include an internally threaded outer end portion and a threadless conical inner end portion, configured to form semi-conical recesses in the body at opposite sides of the internal groove adjacent the internally threaded axial bore. An externally threaded screw in the outer end portion of each radial bore actuates a wedge that engages the semi-conical recesses to apply separating forces thereto.

11 Claims, 2 Drawing Sheets

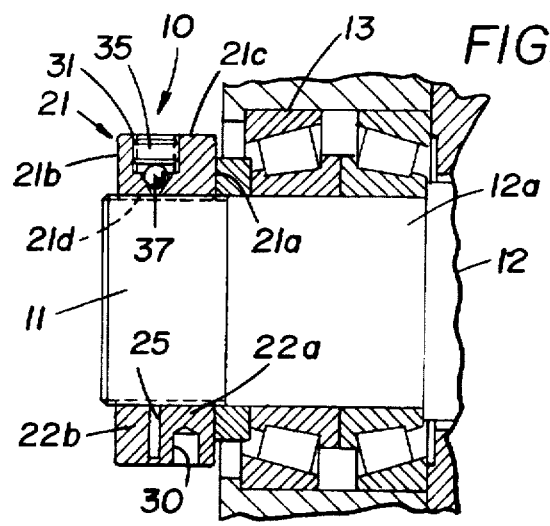
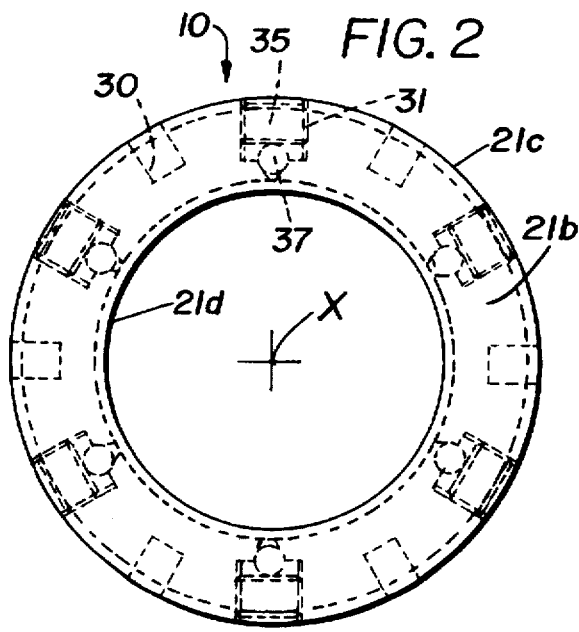
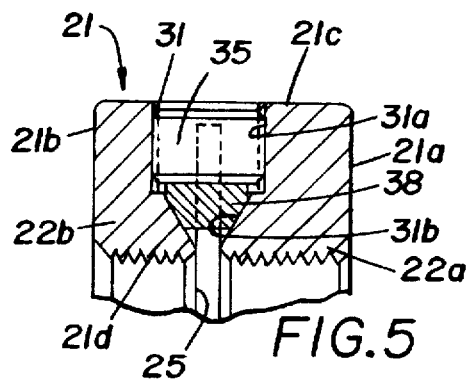
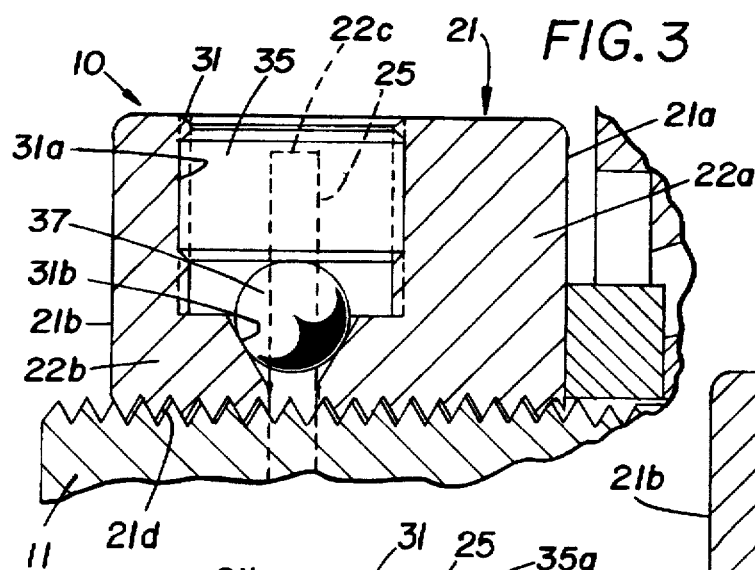
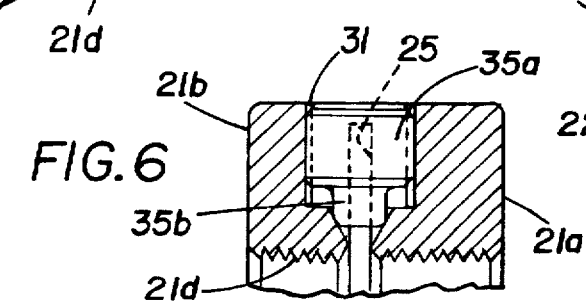
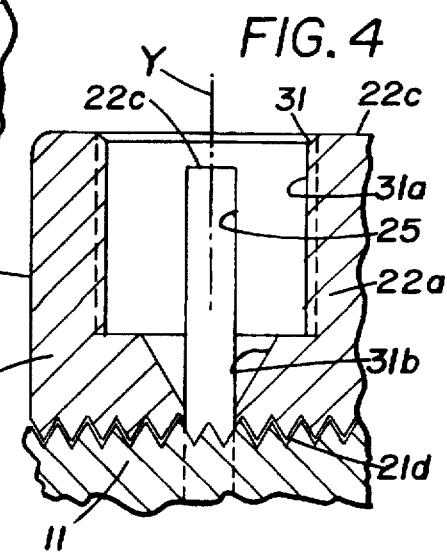

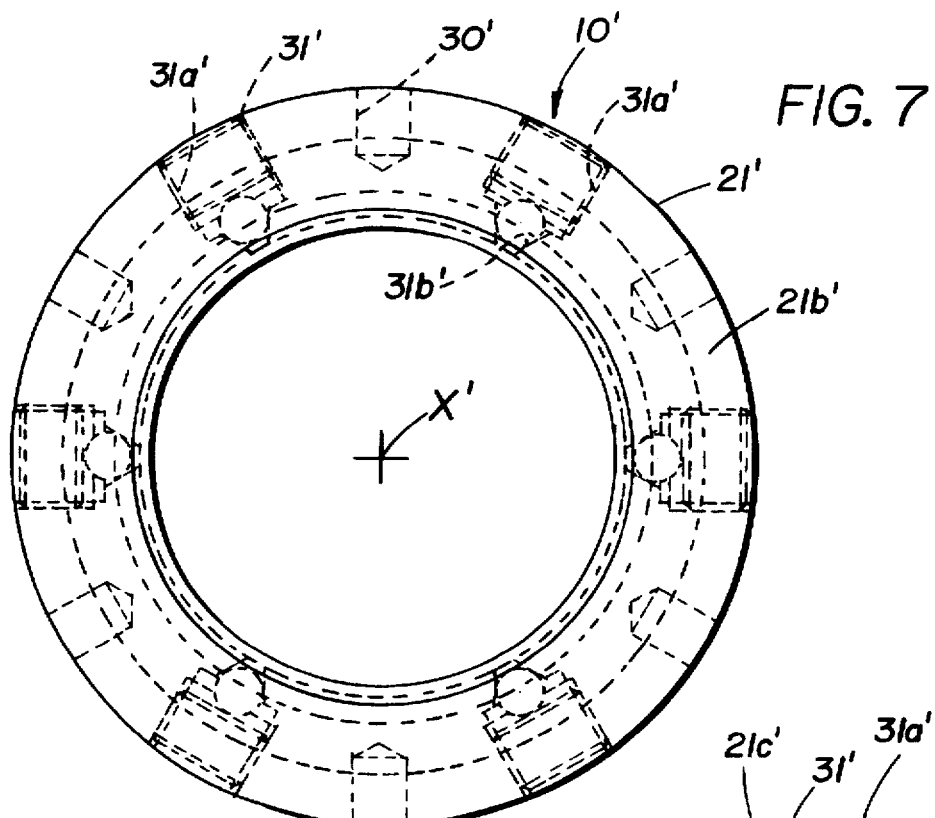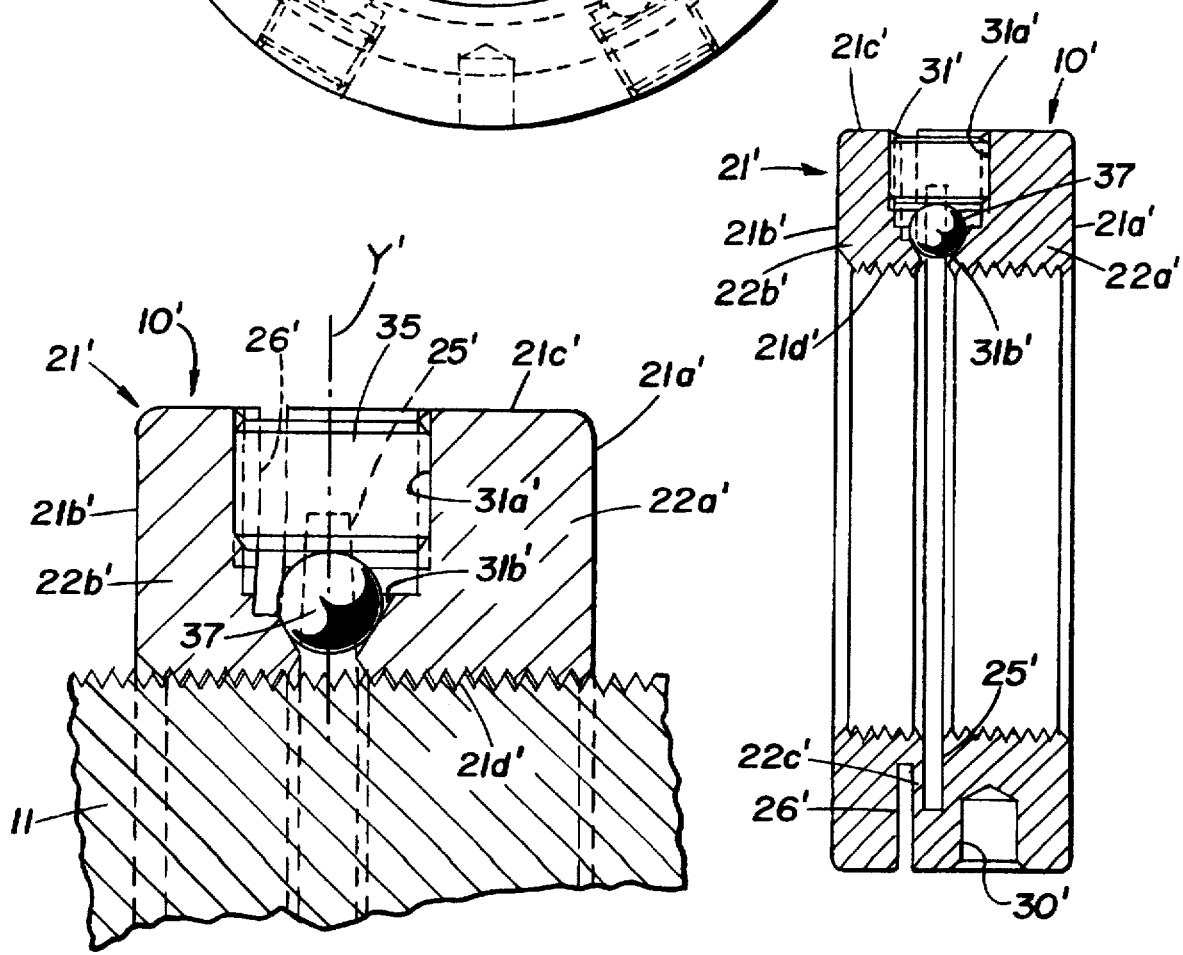

ADJUSTABLE LOCK NUT

CROSS REFERENCE TO RELATED APPLICATION:

This application is a continuation-in part-of Ser. No. 08/608,724, filed: Feb. 29, 1996, now U.S. Pat. No. 5,634,753.

BACKGROUND OF THE INVENTION

Threaded parts are subject to various errors during forming including errors in the thread flank angle and flank shape, and lead errors. In addition, there is an unavoidable clearance between the thread connected parts so that the pitch diameter of the nut and the male thread are not the same. On threads having angled flanks, such as the commonly used 60 degree flank angle, the thread clearance can allow a lock nut to tilt or cock slightly relative to the spindle or shaft and cause an end face on the lock nut to be out of square with the axis of the spindle or shaft. An out of square end face on the lock nut can cause deformation of the spindle or shaft by off-center forces or uneven bearing preload.

Various different lock nuts have heretofore been made. Some lock nuts such as disclosed in U.S. Pat. Nos. 4,086,946 and 5,454,674, press inserts or weakened thread section of the lock nut radially inwardly against the threads on the spindle. These lock nuts only provide locking engagement of the lock nut to the spindle of shaft at circumferentially spaced locations and do not eliminate thread clearance evenly around the entire circumference. U.S. Pat. No. 4,557,652, discloses a lock nut having two separate annular members that are interconnected by elastomeric plugs or an elastomeric ring, and the two members can be forcibly separated by screws threaded in one of the members for adjustment parallel to the axis of the member, to separate the members for locking. Pins are provided to slidably and nonrotatably interconnect the two members, but some relative angular movement can occur do to necessary clearances between the parts.

Adjustable lock nuts have also been made in one piece with one internal and one external groove dividing the lock nut into a load carrying section and a locking section, and a thin intermediate section that integrally connects the load carrying section and the locking section. As disclosed in U.S. Pat. No. 4,043,692 (FIG. 5), the locking section is adapted to be drawn toward the load carrying section by bolts paralleling the axis of the lock nut and threaded into the load carrying section. However , such lock nuts cannot be used in applications where there is insufficient clearance at the end of the lock nut to enable access to the adjusting bolts with a suitable wrench.

SUMMARY OF THE INVENTION

An object of the present invention is to provide an adjustable lock nut having locking screws accessible from the outer circumference of the lock nut to enable use of the lock nut in various installations including installation where there is little clearance at the outer end of the lock nut, and which lock nut is adjustable to align the center line of the lock nut with the male thread; adjust preload, and which is also adjustable to enable fine adjustment of the squareness of the nut contact face.

Accordingly, the present invention provides an adjustable lock nut comprising a one-piece annular body having an internally threaded axial bore extending between end faces of the body and a circumferential outer surface. The body has a narrow annular internal groove opening intermediate the ends of the internally threaded axial bore and the internal groove extends generally radially outwardly from the axial bore and has an outer edge disposed inwardly of the circumferential outer surface of the body. A set of circumferentially spaced radial bores extend inwardly from the circumferential outer surface, with their axes disposed in a plane normal to the body axis and bisecting the internal groove. The radial bores each include an internally threaded outer end portion having a diameter substantially larger than the width of the groove and a threadless conical inner end portion, the conical inner end portion being configured to form semi-conical recesses in the body at opposite sides of the internal groove adjacent the internally threaded axial bore. An externally threaded screw is threaded into the outer end portion of each radial bore and wedge means in each radial bore are actuated by the screw and engage the semi-conical recesses for applying separating forces to wedge end ring portions of the body apart and press the flanks of the threads on the end ring portions against the flanks of the thread on the male member. When the thread clearance is eliminated, the center line of the lock nut will align with the center line of the threads on the male member. Minor compensation for out of parallel components can be made by individually tightening the screws.

BRIEF DESCRIPTION OF THE DRAWINGS

FIG. 1 is a fragmentary view illustrating a first embodiment of the lock nut of the present invention applied to the threaded end of a shaft;

FIG. 2 is a plan view of the lock nut of FIGS. 1;

FIG. 3 is a fragmentary sectional view through the shaft and lock nut, illustrating the lock nut in a locked condition and on a larger scale than FIG. 1;

FIG. 4 is a fragmentary sectional view through the lock nut with the locking screw and wedge removed;

FIG. 5 is a fragmentary view illustrating the lock nut with a modified form of wedge;

FIG. 6 is a fragmentary view of the lock nut illustrating the lock nut with another modified form of locking screw and wedge;

FIG. 7 is a plan view of a modified form of lock nut;

FIG. 8 is a sectional view through the lock nut of FIG. 7; and

FIG. 9 is a fragmentary sectional view of the lock nut of FIG. 7, illustrating the lock nut in a locked condition and on a larger scale than FIG. 7.

DETAILED DESCRIPTION

The adjustable lock nut 10 of the present invention is generally adapted for use to adjust the centerline of the lock nut into alignment with the male threads on an externally threaded member. The lock nut 10 is herein shown mounted on an externally threaded member 11 forming an end portion of a shaft or spindle 12, to adjust preload on roller bearings 13 that support a portion 12a of the shaft or spindle 12. The lock nut 10 comprises a one-piece annular body 21 having an axis designate X in FIG. 2, end faces 21a and 21b, a circumferential outer surface 21c and an internally threaded axial bore 21d. The body 21 has an internal groove 25 opening intermediate the ends of the internally threaded axial bore 21d and extending generally radially outwardly from he axial bore and having an outer edge disposed inwardly from the circumferential outer surface 21c. The groove 25 divides the annular body into first and second end ring portions 22a and 22b that are interconnected by connecting portion 22c at the outer edge of the groove 25. First and second end ring portions 22a and 22b are hereinafter sometimes respectively referred to as the load carrying end ring portion and the locking end ring portion. The internal threads in the threaded bore 21d in the body 21 are formed with the same pitch and flank angle as the threads on the externally threaded shaft portion or member 11, subject to manufacturing tolerances and errors. However, clearances between the threads on the nut and the threads on the shaft are unavoidable and this is illustrated in FIG. 4 by a clearance between both flanks of the threads on the externally threaded member and the threads on the lock nut. When the lock nut hangs loosely on the externally member, the lock nut will cock slightly so that the first end face 21a on the lock nut, hereinafter sometimes referred to as the working end face 21a of a lock nut which is perpendicular to the axis of a body 21, will be slightly out of perpendicular to the axis of the externally threaded member 11.

A set of radial bores 31 are formed in the body 21, preferably after forming the internally threaded bore 21d and the groove, at locations uniformly spaced circumferentially of the annular body. The number of radial bores in the set will vary with the diameter of the lock nut and, in the embodiment shown in FIG. 2, six radial bores are provided, the bores 31, each have an axis designated Y in FIG. 4 disposed in a plane normal to the body axis X and bisecting the internal groove 25. The radial bores 31 each include an internally threaded outer end portion 31a having a diameter substantially larger than the width of the internal groove 25, and a threadless conical inner end portion 31b. As is best shown in FIG. 4, the outer ends 31a of the radial bores are configured to form semi-cylindrical internally threaded recesses in the body at opposite sides of the internal groves 25, and the inner end portions 31b of the bores are configured to form threadless semi-conical recesses in the body at opposite sides of the internal groove 25 and adjacent the axial bore 21d. An externally threaded adjusting screw 35 is threaded into the internally threaded outer end portion 31a of the radial bores, and a wedge means is provided in each radial bore for actuation by the adjusting screws and engageable with the semi-conical recess formed at the inner end of the radial bore.

In the presently preferred embodiment illustrated in FIGS. 1–4, the wedge means comprises a spherical ball 37 engageable with an inner end face on the adjusting screw 35 and having a diameter greater than the width of the internal groove 25 and sufficiently small to be received in the conical inner end portion 31b of the radial bore. The balls are preferably hardened to minimize deformation. The ball has substantially point contact with the inner end of the adjusting screw so that forces applied by the adjusting screws to the balls are transmitted substantially equally to the semi-conical recesses at the inner end of the radial bores, to wedge the end ring portions 22a and 22b axially in relatively opposite directions.

A modified form of wedge means is illustrated in FIG. 5 and comprises a frusto-conical member 38 disposed between the inner end of the adjusting screw 35, and the conical inner end portion 31b of the radial bores. The member 38 has a frusto-conical configuration, preferably generally complementary to the frustoconical inner end portion 31b of the radial bore, and an outer face arranged to engage an inner end face on the adjusting screw 35.

A further modified form of locking screw and wedge is illustrated in FIG. 6. In this embodiment, a set screw 35a is a modified dog-point set screw having an integral nose 35b, with a beveled or rounded end portion arranged to engage the recesses formed by the conical inner end portion 31b of the radial bore.

As is conventional, means such as wrench receiving sockets (not shown) are provided in the outer ends of the adjusting screws 35 and configured to receive a suitable wrench for turning the screws into the radial bores. As is also conventional, means are provided on the outer surface of the end ring portion 22a of the lock nut and shaped to receive a suitable wrench for tightening the lock nut on the threaded member 11. The lock nut may, for example be provided with grooves or sockets best shown at 30 in FIG. 2 for receiving a suitable spanner wrench or, alternatively, with flats on the outside for receiving a conventional open end wrench.

A modified form of lock nut is illustrated in FIG. 7–9. The lock nut of FIGS. 7–9 is generally the same as that shown in FIGS. 1–4, and like numerals are used to designate corresponding parts and like numerals followed by the postscript ' are used to designate modified parts. In the embodiment of FIGS. 7–9, the lock nut 10' comprises a one-piece annular body 21' having a body axis designated X' in Fig.7, first and second end faces 21a' and 21b', an internally threaded axial bore 21d' extending between the end faces and a circumferential outer surface 21c'. The body has a narrow annular internal groove 25' opening intermediate the ends of the internally threaded bore 21d', and the internal groove extends radially outwardly from the axial bore and has an outer edge disposed inwardly of the circumferential outer surface. An external groove 26' opens at the outer circumferential surface 21c' of the body and extends generally radially inwardly from the outer surface at a location spaced along the body axis from the internal groove 25'. The external groove has an internal edge spaced from the circumferential outer surface of the body a distance substantially greater than the spacing of the outer edge of the internal groove from the circumferential outer surface, and the internal and external grooves are configured to divide the body into first or load carrying end ring portions 22a' and second or locking end ring portion 22b' and a thin intermediate ring portion 22c' that is integrally connected at an outer end of the internal groove to the load carrying end ring portion 22a' and integrally connected at the inner end of the external groove to the locking end ring portion 22b'. The internal and external grooves 25' and 26' radially overlap and are spaced axially of the body sufficiently close to each other such that the intermediate portion 22c' is sufficiently thin to flex or deform to allow the end ring portions 22a' and 22b' to be wedged axially in opposite directions a distance at least slightly greater than the clearance between the internal threads of the lock nut and the external threads of the member 11.

A set of circumferentially spaced radial bores 31' extend inwardly from the outer circumferential surface 21c' and the radial bores each have an axis designated Y' in FIG. 9 disposed in a plane normal to the body axis X' and bisecting the internal groove 25'. The radial bores have an internally threaded outer end portion 31a' as previously described, the radial bores 31a' have their axes disposed in a plane Y' that is perpendicular to the body axis X' and bisects the internal groove 25' and a threadless conical inner end portion 31b'. The diameter of the internally threaded outer end portion 31a' of the bores 31' is sufficiently large to form internally threaded recesses in adjacent faces of the end ring portions 22a and 22b, and the conical inner end portions of the bores are configured to form semi-conical recesses in the body at opposite sides of the internal groove adjacent the axial bore.

Externally threaded adjusting screws 35 are threaded into the outer end portions 31a' of the radial bores and wedge means, preferably in the form of balls 37 are disposed in the conical inner end portions of the radial bores. The balls are preferably dimensioned in the manner described in connection with the embodiment of FIGS. 1–4, to engage the semi-conical recesses in adjacent faces of the end ring portions 22a' and 22b' when the adjusting screw is turned into the bore sufficient to forcibly engage the upper side of the ball. Alternatively, it is contemplated that adjusting screw and wedge means such as illustrated in FIGS. 5 and 6, could be used in the locking ring embodiment of FIG. 7–9.

As described in connection with the embodiment of FIGS. 1–4, means 30' such wrench receiving grooves or sockets or flats are provided on the outer periphery of load carrying end ring portion 22a' for receiving a suitable wrench for turning the lock nut.

When installing a lock nut on a externally threaded member such as a threaded end or portion of a shaft or spindle, to adjust preload and secure a bearing, the lock nuts are preferably first threaded on the threaded member in an unexpanded condition until the lock nut is closely adjacent, but spaced from the bearing. The adjusting screws are then tightened evenly around the circumference of the lock nut, while repeatedly testing the rotatability of the lock nut on the threads, until the threads on the lock nut snugly engage the threads on the shaft and align the axis of the lock nut with the axis of the threaded member 11. The lock nut is then turned on the shaft until the operating end face 21a of the lock nut engages and applies the desired preload to the thrust washer or thrust bearing. The adjusting screws are thereafter further tightened equally to further spread the end ring portions and provide a desired locking engagement between the internal threads on the lock nut and the external threads on the member 11. Fine adjustment of the squareness of the nut contact face 21a can be made after adjusting the preload, by tightening selected adjusting screws to force the contact face on the lock nut to adapt to the end face of the component being locked on the shaft.

The embodiments of the invention in which an exclusive property or privilege is claimed are defined as follows:

1. An adjustable lock nut adapted to be lockingly secured on a threaded member comprising: a one-piece annular body having a body axis, first and second end faces, an internally threaded axial bore extending between the end faces, and a circumferential outer surface, the body having a narrow annular internal groove opening intermediate the ends of said internally threaded axial bore, the internal groove extending generally radially outwardly from the axial bore and having an outer edge disposed inwardly of the circumferential outer surface, the annular body having a set of circumferentially spaced radial bores extending inwardly from the circumferential outer surface, the radial bores of the set each having an axis disposed in a plane normal to the body axis and bisecting the internal groove, the radial bores of the set each including an internally threaded outer end portion having a diameter substantially larger than the width of the internal groove and a threadless conical inner end portion, each conical inner end portion of the radial bores of the set being configured to form semi-conical recesses in the body at opposite sides of the internal groove adjacent said axial bore, an externally threaded screw in the internally threaded outer end portion of each radial bore of the set, and wedge means in each radial bore of the set actuated by said screws and engageable with the semi-conical recesses for applying separating forces thereto.

2. An adjustable lock nut according to claim 1 wherein said wedge means comprises a ball.

3. An adjustable lock nut according to claim 1 wherein the wedge means comprises a conical member having an outer face engageable with an inner end of the externally threaded screw and a conical face engaging said semi-conical recesses.

4. An adjustable lock nut according to claim 1 wherein said wedge means is fixed to an inner end of the externally threaded screw.

5. An adjustable lock nut according to claim 1 wherein the body has an external groove opening at the circumferential outer surface and extending radially inwardly from the outer surface at a location spaced along the body axis from one side of the internal groove; the external groove having an inner edge spaced from the circumferential outer surface of the body a distance substantially greater than the spacing of the outer edge of the internal groove from the circumferential outer surface.

6. An adjustable lock nut adapted to be lockingly secured on a threaded member comprising: a one-piece annular body having a body axis, first and second end faces, an internally threaded axial bore extending between the end faces, and a circumferential outer surface, the body having a narrow annular internal groove opening intermediate the ends of said internally threaded axial bore, the internal groove extending generally radially outwardly from the axial bore and having an outer edge disposed inwardly of the circumferential outer surface, the annular body having a set of circumferentially spaced radial bores extending inwardly from the circumferential outer surface, the radial bores of the set each having an axis disposed in a plane normal to the body axis and bisecting the internal groove, the radial bores of the set each having outer end portions configured to form semicylindrical internally threaded recesses in the body at opposite sides of the internal recess, the radial bores of the set each having inner end portions configured to form threadless semi-conical recesses in the body at opposite sides of the internal groove adjacent said axial bore, an externally threaded screw in the internally threaded outer end portion of each radial bore of the set, and wedge means in each radial bore actuated by said screws and engageable with semi-conical recesses for applying separating forces thereto.

7. An adjustable lock nut according to claim 6 wherein said wedge means comprises a ball.

8. An adjustable lock nut according to claim 6 wherein the wedge means comprises a conical member having an outer face engageable with an inner edge of the externally threaded screw and a conical face engaging said semi-conical recesses.

9. An adjustable lock nut according to claim 6 wherein said wedge means is fixed to an inner end of the externally threaded screw.

10. An adjustable lock nut adapted to be lockingly secured on a threaded member comprising: a onepiece annular body having a body axis, first and second end faces, an internally threaded axial bore extending between the end faces, and a circumferential outer surface, the body having a narrow annular internal groove opening intermediate the ends of said internally threaded axial bore, the internal groove extending generally radially outwardly from the axial bore and having an outer edge disposed inwardly of the circumferential outer surface, the body having a narrow external groove opening at the circumferential outer surface and extending radially inwardly from the outer surface at a location spaced along the body axis from the internal groove, the external groove having an inner edge spaced from the circumferential outer surface of the body a distance substantially greater than the spacing of the internal groove from the circumferential outer surface, the annular body having a set of circumferentially spaced radial bores extending inwardly from the circumferential outer surface, the radial bores of the set each having an axis disposed in a plane normal to the body axis and bisecting said internal groove, the radial bores each having an internally threaded outer end portion and a threadless conical inner end portion, the conical inner end portions of the radial bores of the set being configured to form semi-conical recesses in the body at opposite sides of the internal groove adjacent said axial bore,
an externally threaded screw in the internally threaded outer end portion of each radial bore of the set, and wedge means in each radial bore of the set actuated by said screws and engageable with semi-conical recesses for applying separating forces thereto.

11. An adjustable lock nut according to claim 10 wherein said wedge means comprises a ball.

* * * * *